Oct. 8, 1940.                R. T. COOKE                2,217,103
MACHINE FOR MIXING OR MASTICATING RUBBER AND LIKE MATERIAL
Filed March 28, 1938

INVENTOR
Rupert T. Cooke
BY
Richard E. Babcock
ATTORNEY

Patented Oct. 8, 1940

2,217,103

UNITED STATES PATENT OFFICE 2,217,103

MACHINE FOR MIXING OR MASTICATING RUBBER AND LIKE MATERIAL

Rupert Thomas Cooke, Sunningdale, England, assignor to Francis Shaw and Company Limited, Bradford, Manchester, England, a British company Application March 28, 1938, Serial No. 198,599
In Great Britain April 10, 1937

2 Claims. (Cl. 221—122)

This invention relates to machines for treating rubber and similar material and has particular reference to machines for masticating, working, kneading or mixing rubber which is to be used for various industrial purposes. Such machines comprise masticating, working, kneading or mixing rollers mounted in a casing and surmounted by a hopper from which the materials to be mixed or masticated are fed. Such materials usually comprise rubber and powdered filling and like materials to be mixed therewith, the rubber or like materials usually being first fed to the kneading or mixing apparatus and the powdered material subsequently added. Two methods are commonly used, one in which the rubber is first fed from the hopper to the rolls and then the powdered material through the same hopper and another in which separate hoppers are used one for the rubber and the other for the powdered material so that the entrance of the latter to the mixer or kneader can be controlled.

The principal object of the present invention is to provide in machines of the kind referred to a combined hopper from which both the rubber and powder can be fed the latter in a regulatable manner.

According to the present invention a hopper is provided which is formed in one with or mounted on the chute in machines of the kind referred to and having an inclined floor terminating at its lowest point in a comparatively small outlet opening, leading to the chute, which is provided with means such as a rotating paddle wheel or the like to control the feed of the powder material. Above said powder outlet is a second and larger outlet opening leading from the hopper to the chute through which the rubber or like material placed in the former pass to the latter, said second outlet opening being provided with a door which can be moved either to close the same or to cover the powder outlet, the arrangement being such that when said door is open any rubber or like material placed in the hopper immediately passes through the second outlet to the chute, said door then being moved to close said inlet and open the passage for the powdered material, which is then placed in the hopper, usually after a space of time sufficient to permit of a preliminary kneading of the rubber before the powder descends in a regulated stream to be mixed with the same.

The hopper is provided with a lid or door of any convenient construction.

The invention will be more particularly described by the aid of the accompanying drawing in which the same reference letters or characters are used throughout the several views to denote the same thing or part and in which.

Figure 1:
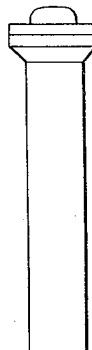
Figure 1 is a front elevation of the improved hopper and associated gearing applied thereto.

In carrying the invention into effect according to one convenient manner as illustrated and as adapted for application to known rubber mixing machines comprising mixing rollers rotatably mounted in a casing surmounted by a chute down which the materials from the hopper descend the improved hopper 4 is provided with an inclined floor 5 terminating near the bottom of the chute where it is provided with a comparatively narrow powder outlet 6 of substantially the same width as the hopper. Rotatably mounted in said outlet 6 is a transverse paddle wheel 7 extending the full width of the same and serving to control the egress of the powdered filling and like material, a baffle plate 8 extending across the hopper above the paddle wheel 7 to restrict the passage to the paddle wheel and prevent the powdered material, when first poured into the hopper descending too suddenly on to the paddle wheel.

The paddle wheel 7 is keyed to a shaft 9 passing through the hopper and journalled in bearings at each end. One end of the shaft 9 is extended to a journal in the bracket 10, and rotatably mounted on said extension is a bevelled wheel 11 adapted to be secured to the shaft 9 by the claw clutch 12 splined on said shaft and adapted to be moved to the operative and inoperative positions by the forked lever 13 rocked by the hand lever 14.

Meshing with the bevel pinion 11 is a complemental pinion 15 keyed to a spindle 16 geared to the main driving shaft of the rubber mixing machine (not shown), so that rotary motion is imparted to the paddle wheel 7 as governed by the claw clutch 12 when the machine is in motion.

Above the powder regulator 7 is hingedly mounted a flap 21 or door extending completely across the hopper and adapted to close a comparatively wide aperture 22 constituting the outlet from the hopper 4 to the chute for the rubber. Said flap 21 is hinged horizontally and rigidly attached at the lower edge to a cross shaft 23 the ends of which project exteriorly of the hopper where one end is provided with a crank arm 24 coupled to a piston 25 working in the rocking cylinder 26 to which compressed air is supplied by means of the flexible conduit 27 from the compressed air supply pipe 28 through a two way valve in a valve casing 29 mounted on the hopper, said casing having an exhaust outlet 30, the valve being actuated by the handle 31 for the admission and exhaust respectively of the pressure fluid.

Figure 2:
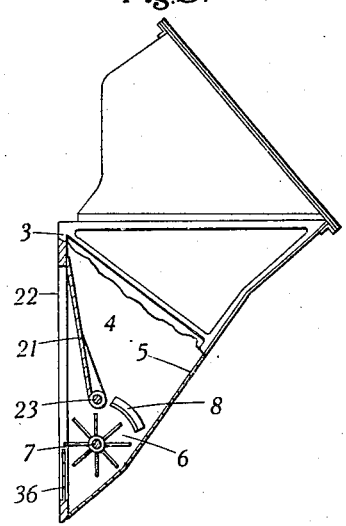
Figure 2 is a part sectional side elevation of the hopper showing in detail the hinged inlet door in the closed position and Figure 3 is a view corresponding to Figure 2 showing the hinged inlet door in the open position.
Figure 3:
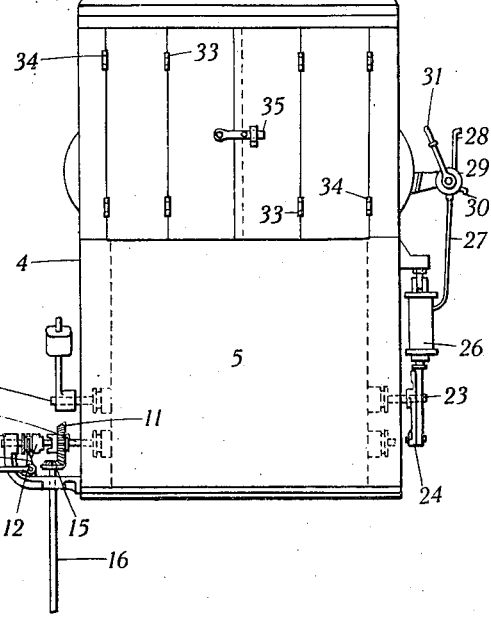
Figure 3:
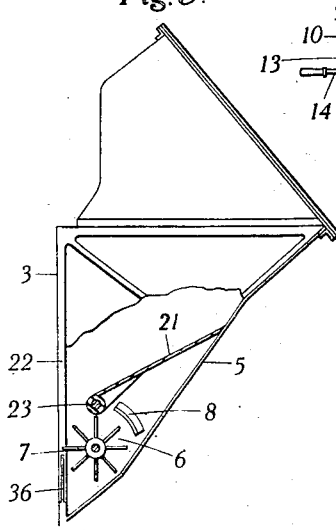

Instead of actuating the flap 21 by means of pressure fluid it may be coupled by means of a link to a hand operated lever located at a convenient point by means of which the shaft may be rocked to open or close said inlet, the flap when raised closing the inlet 22 as shown in Figure 2 but when it is lowered until the top edge meets the inclined floor 5 as seen in Figure 3 it constitutes what may be termed an inclined false floor, so that when in this position any rubber dough placed in the hopper 4 slides unimpeded into the chute, a grid 36 of vertical bars being mounted in front of the paddle wheel 7 to constitute a guard to prevent pieces of rubber bouncing up or being flung into the paddle wheel during the preliminary kneading or mixing.

When said rubber has passed to the chute the flap 21 is turned into the vertical or raised position to close the outlet and leave an unrestricted passage for the powdered material which is then placed in the hopper and passes through the before mentioned regulator to the chute and thence to the mixer in controlled manner. The hopper 4 is provided with a door 32 of suitable construction, preferably formed in sections, two on either side each pair being hinged together at 33 and to the respective side of the hopper at 34, a latch 35 being provided to retain it in the closed position.

By these means rubber mixing and like machines are provided with a single feed hopper to receive all the ingredients the feed of which may be controlled in the preferred manner. Having now particularly described and ascertained the nature of my said invention and in what manner the same is to be performed, I declare that what I claim is:

1. A feed hopper, for feeding comparatively large lumps of plastic material such as rubber dough and powdered material, formed with two outlet openings on a common side, comprising a plain outlet opening at the top for the lumps of plastic material and a bottom outlet opening with feeding and regulating means located therein for the powdered material, a lid hingedly mounted between said openings, said lid being swingable to a position where it closes said bottom opening, shutting off the supply of powdered material to said feeding and regulating means, and at the same time serves as an artificial inclined floor to guide the plastic material through said top opening, and also being swingable to a position where it closes the top opening and forms a passage for the powdered material to flow to the feeding and regulating means.

2. A feed hopper for feeding comparatively large lumps of plastic material such as rubber dough and powdered material formed with two outlet openings on a common side, comprising a plain outlet opening at the top for the lumps of plastic material and a bottom outlet opening with feeding and regulating means located therein for the powdered material, a lid being swingable to a position where it closes said bottom opening shutting off the supply of material to said feeding and regulating means, and at the same time serves as an artificial inclined floor to guide the plastic material through said opening, and a guard to prevent the plastic material leaving the upper outlet opening being flung back into the lower outlet opening, said lid also being swingable to a position where it closes the top opening and forms a passage for the powdered material to flow to the feeding and regulating means.

RUPERT THOMAS COOKE.